United States Patent
DeCraene et al.

(10) Patent No.: US 9,126,676 B2
(45) Date of Patent: Sep. 8, 2015

(54) COMPACT TWO AXIS GIMBAL FOR CONTROL STICK

(71) Applicant: Woodward MPC, Inc., Skokie, IL (US)

(72) Inventors: Matthew P. DeCraene, Lisle, IL (US);
Matthew Kramer, Chicago, IL (US);
Nathan Thompson, Wilmette, IL (US);
Anton Petrou, Hawthorn Woods, IL (US)

(73) Assignee: Woodward MPC, Inc., Skokie, IL (US)

( * ) Notice: Subject to any disclaimer, the term of this patent is extended or adjusted under 35 U.S.C. 154(b) by 408 days.

(21) Appl. No.: 13/657,294

(22) Filed: Oct. 22, 2012

(65) Prior Publication Data

US 2013/0105634 A1 May 2, 2013

Related U.S. Application Data

(60) Provisional application No. 61/552,493, filed on Oct. 28, 2011.

(51) Int. Cl.
*B64C 13/04* (2006.01)
*B64C 13/34* (2006.01)
*G05G 5/03* (2008.04)
*G05G 9/047* (2006.01)

(52) U.S. Cl.
CPC *B64C 13/04* (2013.01); *G05G 5/03* (2013.01); *G05G 9/047* (2013.01); *G05G 2009/04718* (2013.01)

(58) Field of Classification Search
CPC ........ B64C 13/04; B64C 13/12; B64C 13/34; B64C 13/46
USPC ................. 244/223, 231, 237; 475/4
See application file for complete search history.

(56) References Cited

U.S. PATENT DOCUMENTS

| | | | | |
|---|---|---|---|---|
| 2,417,725 | A | * 3/1947 | Zuck | 244/231 |
| 3,363,480 | A | * 1/1968 | Murphy | 475/4 |
| 3,776,058 | A | 12/1973 | French | |
| 3,902,379 | A | 9/1975 | Bennett et al. | |

(Continued)

FOREIGN PATENT DOCUMENTS

| CN | 101370701 A | 2/2009 |
|---|---|---|
| FR | 2 558 136 A1 | 7/1985 |

(Continued)

*Primary Examiner* — Tien Dinh
*Assistant Examiner* — Richard R Green
(74) *Attorney, Agent, or Firm* — Reinhart Boerner Van Deuren P.C.

(57) ABSTRACT

An electromechanical portion of the control stick includes a two-axis gimbal, with each axis including a mechanical gimbal structure supported by rolling element bearings, cam based centering mechanisms, linkages to connect a geared power-drive including a resolver commutated brushless DC motor and compound-planetary gearhead to provide active force feedback, and several electrically independent RVDT position sensors. The gearing architecture uses a fixed-cage, rotating internal gear arrangement on a planetary gearhead, which may be single or multi-stage. The output torque of the gearhead is provided by a feature on the outer housing of the rotating internal ring gear, allowing an axial placement of the entire power-drive in a more central location, reducing the moment load on the gearhead output cage bearings, and facilitating a compact drive arrangement of the gimbal using linkages. Additionally, a common power-drive can be used for both the roll and pitch axes.

20 Claims, 5 Drawing Sheets

(56) References Cited

U.S. PATENT DOCUMENTS

| | | |
|---|---|---|
| 4,422,851 A | 12/1983 | Hayashigawa et al. |
| 4,473,203 A | 9/1984 | Barnoin et al. |
| 4,688,443 A | 8/1987 | Fabre et al. |
| 4,716,399 A | 12/1987 | Nordlund |
| 4,717,098 A | 1/1988 | Walker et al. |
| 5,107,080 A | 4/1992 | Rosen |
| 5,149,023 A | 9/1992 | Sakurai et al. |
| 5,291,113 A | 3/1994 | Hegg et al. |
| 5,456,428 A | 10/1995 | Hegg |
| 5,694,014 A | 12/1997 | Hegg et al. |
| 5,900,710 A | 5/1999 | Gautier et al. |
| 6,128,554 A | 10/2000 | Damotte |
| 6,572,055 B1 | 6/2003 | Bernard |
| 2003/0183440 A1 | 10/2003 | Thomas et al. |
| 2004/0160415 A1 | 8/2004 | Rosenberg et al. |
| 2008/0142642 A1 | 6/2008 | Marino et al. |
| 2009/0125166 A1 | 5/2009 | Johnson et al. |
| 2009/0234518 A1 | 9/2009 | Irwin, III et al. |
| 2009/0314901 A1 | 12/2009 | Granier et al. |
| 2010/0025539 A1* | 2/2010 | Hanlon et al. ............. 244/223 |
| 2012/0025029 A1 | 2/2012 | Szulyk et al. |
| 2012/0025030 A1 | 2/2012 | Stachniak et al. |
| 2012/0025031 A1 | 2/2012 | Stachniak et al. |
| 2012/0097800 A1 | 4/2012 | Burroughs et al. |
| 2012/0160967 A1 | 6/2012 | Scott et al. |

FOREIGN PATENT DOCUMENTS

| | | |
|---|---|---|
| GB | 126568 | 5/1919 |
| GB | 2465671 A | 6/2010 |
| JP | 2008204098 A | 9/2008 |
| WO | WO 2006/018027 A2 | 2/2006 |

* cited by examiner

COMPACT TWO AXIS GIMBAL FOR CONTROL STICK

CROSS-REFERENCE TO RELATED PATENT APPLICATIONS

This patent application claims the benefit of U.S. Provisional Patent Application No. 61/552,493, filed Oct. 28, 2011, the entire teachings and disclosure of which are incorporated herein by reference thereto.

FIELD OF THE INVENTION

This invention generally relates to aircraft control systems, and more particularly to control stick devices for converting pilot input for roll and pitch control into electrical signals. The Invention could also be used in any application that requires converting two axis of mechanical input into an electrical input.

BACKGROUND OF THE INVENTION

An input device for converting pilot input for roll and pitch control typically includes a pilot input device that is operably connected to a two axis-gimbal structure that allows for operably manipulating the pilot input device about two axes to control pitch and roll of an aircraft. Many aircrafts use "fly-by-wire" control where the control stick is not directly connected to the control surfaces of the aircraft. Instead, the control stick includes a plurality of position sensors that sense the change in position of the pilot input device and convert the changes in position of the pilot input device into electrical signals that can be used to electronically control actuators that manipulate the control surfaces of the aircraft.

Force feedback has been built into these fly-by-wire style control sticks so as to simulate the tactile feel a pilot would have experienced in control sticks where the control stick is mechanically linked to the control surfaces of the aircraft.

Due to the limited space in a cockpit of an aircraft, it is always desired to reduce the size of the components of the control stick so as to provide the most compact and lightweight package as possible. Further, it is also desired to provide the most cost-effective design as possible. Embodiments of the present invention provide a novel and nonobvious combination of electromagnetic and mechanical components which result in a compact architecture for providing the electromechanical portion of a two-axis active control stick. These and other advantages of the invention, as well as additional inventive features, will be apparent from the description of the invention provided herein.

BRIEF SUMMARY OF THE INVENTION

In view of the above, embodiments of the present invention provide a new and improved compact two axis control stick is provided.

In one embodiment, a compact two-axis control stick having a pilot input device, a pitch force feedback drive, a roll force feedback drive, a pitch linkage and a roll linkage is provided. The pilot input device is pivotable about a pitch axis and a roll axis. The pitch force feedback drive includes a pitch motor including an output shaft and a pitch gear train. The pitch gear train includes a pitch sun gear mounted to the output shaft of the pitch motor, a plurality of pitch planet gears mounted to a fixed position pitch carrier, and a pitch ring gear. The plurality of pitch planet gears are radially positioned between the pitch sun gear and the pitch ring gear.

The roll force feedback drive includes a roll motor including an output shaft and a roll gear train. The roll gear train includes a roll sun gear mounted to the output shaft of the roll motor, a plurality of roll planet gears mounted to a fixed position roll carrier, and a roll ring gear. The plurality of roll planet gears are radially positioned between the roll sun gear and the roll ring gear. The pitch linkage operably couples the pitch force feedback drive to the pilot input device. The pitch linkage is operably coupled to the pilot input device and the pitch ring gear such that rotation of the pitch ring gear causes rotation of the pilot input device about the pitch axis. The roll linkage operably couples the roll force feedback drive to the pilot input device. The roll linkage is operably coupled to the pilot input device and the roll ring gear such that rotation of the roll ring gear causes rotation of the pilot input device about the roll axis.

In one embodiment, the roll force feedback drive and the pitch force feedback drive are substantially identical.

In one embodiment, the pitch motor output shaft rotates about a rotational axis that is parallel to the pitch axis and the roll motor output shaft rotates about a rotational axis that is parallel to the roll axis. The rotational axes of the pitch motor output shaft and the roll motor output shaft are general perpendicular to one another.

In one embodiment, the control stick further includes a pitch centering mechanism acting on the pilot input device to bias the pilot input device to a pitch home position when the pilot input device is rotated about the pitch axis away from the pitch home position. The control stick also includes a roll centering mechanism acting on the pilot input device to bias the pilot input device to a roll home position when the pilot input device is rotated about the roll axis away from the roll home position.

In one embodiment, the control stick further includes a base frame to which the pilot input device is operably pivotably mounted for rotation about the pitch and roll axes. The fixed position pitch carrier defines a rotational axis for each of the plurality of pitch planet gears. The fixed position pitch carrier has a fixed position relative to the base frame and maintains the rotational axes of the plurality of pitch planet gears in a fixed position relative to the base frame. The fixed position roll carrier defines a rotational axis for each of the plurality of roll planet gears. The fixed position roll carrier has a fixed position relative to the base frame and maintains the rotational axes of the plurality of roll planet gears in a fixed position relative to the base frame.

In one embodiment, the pitch ring gear includes a radially outward extending attachment feature. The pitch linkage is pivotally connected to the radially outward extending attachment feature of the pitch ring gear proximate a first end of the pitch linkage and the pitch linkage is operably pivotally connected to the pilot input device proximate a second end of the pitch linkage. The roll ring gear includes a radially outward extending attachment feature. The roll linkage pivotally connected to the radially outward extending attachment feature of the roll ring gear proximate a first end of the roll linkage and the roll linkage is operably pivotally connected to the pilot input device proximate a second end of the roll linkage.

In one embodiment, the pitch ring gear has a first end adjacent the pitch motor and a second end, opposite the first end. The second end is spaced away from the pitch motor with the first end positioned axially between the second end and the pitch motor along an axis defined by the pitch motor output shaft. The radially outward extending attachment feature of the pitch ring gear does not extend axially beyond the second end of the pitch ring gear. The roll ring gear has a first end adjacent the roll motor and a second end, opposite the first end. The second end is spaced away from the roll motor with the first end positioned axially between the second end and the roll motor along an axis defined by the roll motor output shaft. The radially outward extending attachment feature of the roll ring gear does not extend axially outward beyond the second end.

In one embodiment, the pitch force feedback drive includes a pair of axially spaced apart gearhead carrier bearings radially supporting the pitch ring gear for rotation. The radially outward extending attachment feature of the pitch ring gear is substantially axially centered relative to the pair of axially spaced apart gearhead carrier bearings. The roll force feedback drive includes a pair of axially spaced apart gearhead carrier bearings radially supporting the roll ring gear for rotation. The radially outward extending attachment feature of the roll ring gear is substantially axially centered relative to the pair of axially spaced apart gearhead carrier bearings.

In an alternative embodiment, the radially outward extending attachment feature of the pitch ring gear has a pair of axially spaced apart legs that extend radially outward and the pitch linkage is positioned between the pair of axially spaced apart legs. The radially outward extending attachment feature of the roll ring gear has a pair of axially spaced apart legs that extend radially outward and the roll linkage is positioned between the pair of axially spaced apart legs.

However, in other embodiments, the radially outward extending attachment feature of the ring gear has a single leg extending radially outward. In one embodiment, the leg may be positioned proximate the gear head carrier bearing closest to the motor. Alternatively, the leg may be centered between the pair of gear head carrier bearings.

The linkage may be attached on either side of the leg depending on the particular location of the force feedback drive relative to the pilot input device. In one embodiment, the linkage, and particularly the pitch linkage, may be coupled to a motor side of leg such that the linkage is axially offset over the motor and entirely axially offset from the ring gear. This allows the pitch linkage to be substantially, if not completely, in line with the roll axis of rotation and to center the pitch force feedback drive substantially centered on the roll axis of rotation. In an alternative embodiment, the linkage may be attached on the opposite side of the leg such that the linkage is positioned axially between the pair of gear head carrier bearings and it is axially offset over the ring gear rather than over the motor. However, in any configuration, it is desired that the linkage is not axially offset away from the motor and beyond the end of the ring gear furthest from the motor so as to avoid increasing the overall length of the force feedback drive.

In one embodiment, a method of providing force feedback to a pilot input device is provided. The method includes sensing a displacement of the pilot input device about a pitch axis; providing pitch force feedback to bias the pilot input device back toward a pitch home position using a pitch force feedback drive operably connected to the pilot input device with a pitch linkage. The pitch force feedback drive includes a pitch motor including an output shaft and a pitch gear train. The pitch gear train includes a pitch sun gear mounted to the output shaft of the pitch motor, a plurality of pitch planet gears mounted to a fixed position pitch carrier, and a pitch ring gear. The plurality of pitch planet gears are radially positioned between the pitch sun gear and the pitch ring gear. The pitch linkage is directly operably coupled to the pitch ring gear. The method further comprising sensing a displacement of the pilot input device about a roll axis and providing roll force feedback to bias the pilot input device back toward a roll home position using a roll force feedback drive operably connected to the pilot input device with a roll linkage. The roll force feedback drive includes a roll motor including an output shaft and a roll gear train including a roll sun gear mounted to the output shaft of the roll motor, a plurality of roll planet gears mounted to a fixed position roll carrier, and a roll ring gear, the plurality of roll planet gears radially positioned between the roll sun gear and the roll ring gear, the roll linkage directly coupled to the roll ring gear.

Additional methods include the features of the control stick outlined above.

In one embodiment, an apparatus for providing force feedback to a pilot input device including a force feedback drive and a linkage is provided. The force feedback drive includes a motor including an output shaft and a gear train. The gear train includes a sun gear mounted to the output shaft of the motor, a plurality of planet gears mounted to a fixed position carrier, and a ring gear. The plurality of planet gears are radially positioned between the sun gear and the ring gear. The linkage is configured to operably couple the force feedback drive to the pilot input device. The linkage is configured to be operably coupled to the pilot input device. The linkage is operably directly coupled to the ring gear such that rotation of the pitch ring gear causes motion of the linkage. The ring gear provides the gear train output.

In one embodiment, the fixed position carrier defines a rotational axis for each of the plurality of planet gears. The fixed position carrier has a fixed position relative to motor and maintains the rotational axes of the plurality of planet gears in a fixed position relative to the motor.

In one embodiment, the ring gear includes a radially outward extending attachment feature. The linkage is pivotally connected to the radially outward extending attachment feature of the ring gear proximate a first end of the linkage.

In one embodiment, the ring gear has a first end adjacent the motor and a second end, opposite the first end. The second end is spaced away from the motor with the first end positioned axially between the second end and the motor along an axis defined by the motor output shaft. The radially outward extending attachment feature does not extending axially beyond the second end of the ring gear in a direction extending away from the motor.

In one embodiment, a pair of axially spaced apart gearhead carrier bearings radially supports the ring gear for rotation. The radially outward extending attachment feature is substantially axially centered relative to the pair of axially spaced apart gearhead carrier bearings.

In an alternative embodiment, the radially outward extending attachment feature of the ring gear has a pair of axially spaced apart legs that extend radially outward and the linkage is positioned between the pair of axially spaced apart legs.

However, in other embodiments, the radially outward extending attachment feature of the ring gear has a single leg extending radially outward. The linkage may be attached on either side of the leg.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
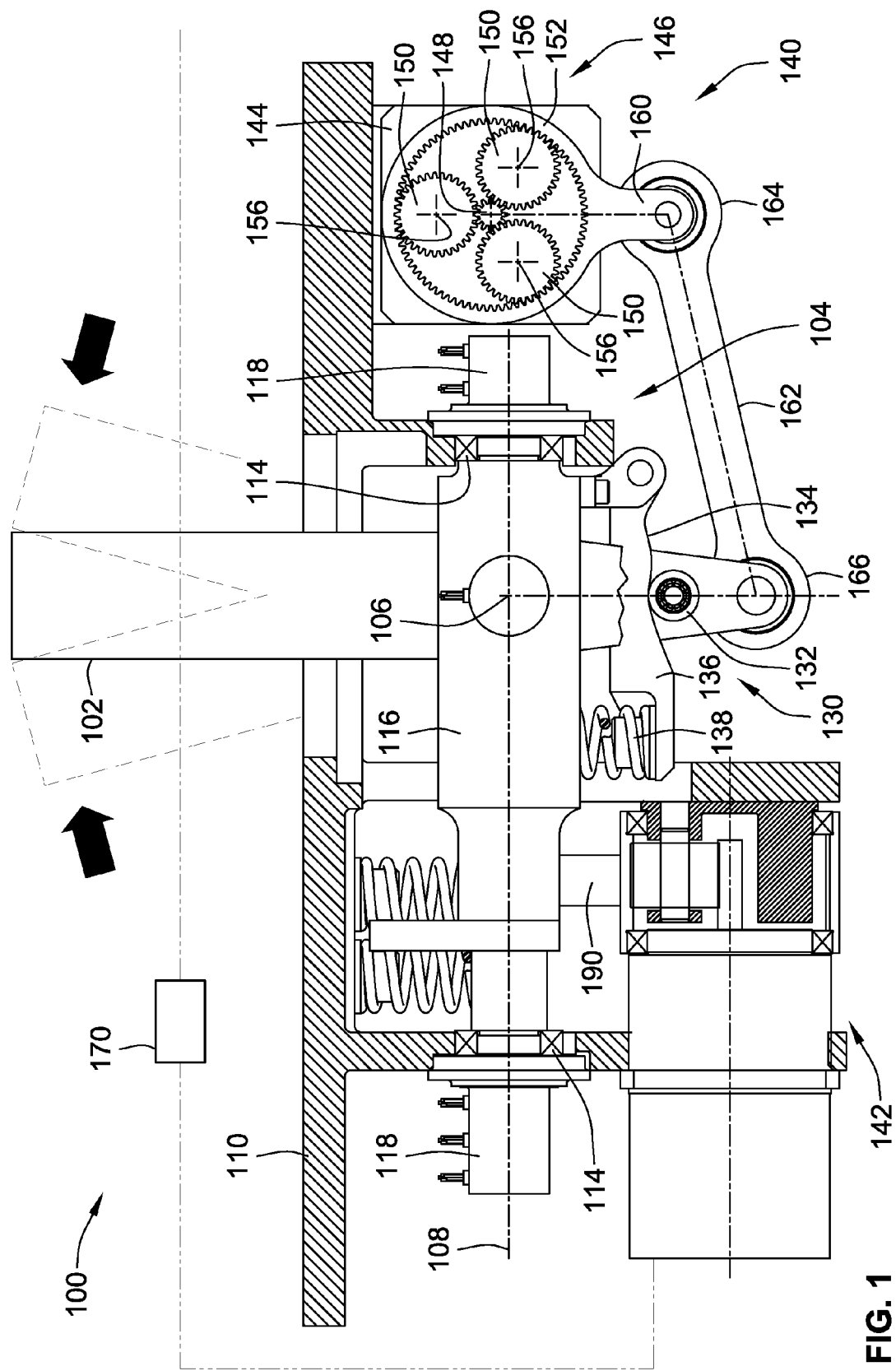
FIG. 1 is a partial illustration of an embodiment a compact two-axis control stick constructed in accordance with the teachings of the present invention.

FIG. 1 illustrates, in simplified form, a compact two-axis control stick 100 (also referred to as "control stick 100") according to an embodiment of the invention. The control stick 100 is used for controlling the pitch and roll of an aircraft.

The two-axis control stick 100 includes a pilot input device 102 which the pilot uses to provide control inputs for controlling the pitch and roll of the aircraft. The pilot input device 102 is carried by a two-axis gimbal arrangement 104 configured to allow the control stick to pivot about a pitch axis 106 and a roll axis 108, which are generally perpendicular to one another in the illustrated embodiment. The pitch axis 106 is perpendicular to the page for FIG. 1.

Each axis includes a mechanical gimbal structure supported by rolling element bearings, cam based centering mechanisms, linkages to connect a geared power-drive including a resolver commutated brushless DC motor and compound-planetary gearhead to provide active force feedback to the user, and several position sensors to convert mechanical rotation into electrical signals for the flight computer.

In the illustrated embodiment, the two-axis gimbal arrangement 104 is operably carried by base frame 110. In FIG. 1, a roll axis gimbal structure 116 is best illustrated. The roll axis gimbal structure 116 is supported by rolling element bearings 114 for rotation about the roll axis 108. Several electrically independent rotary variable differential transformer sensors 118 (RVDT sensors 118) cooperate with the roll axis gimbal structure 116 to convert mechanical rotation into electrical signals for the flight computer.

Figure 2:
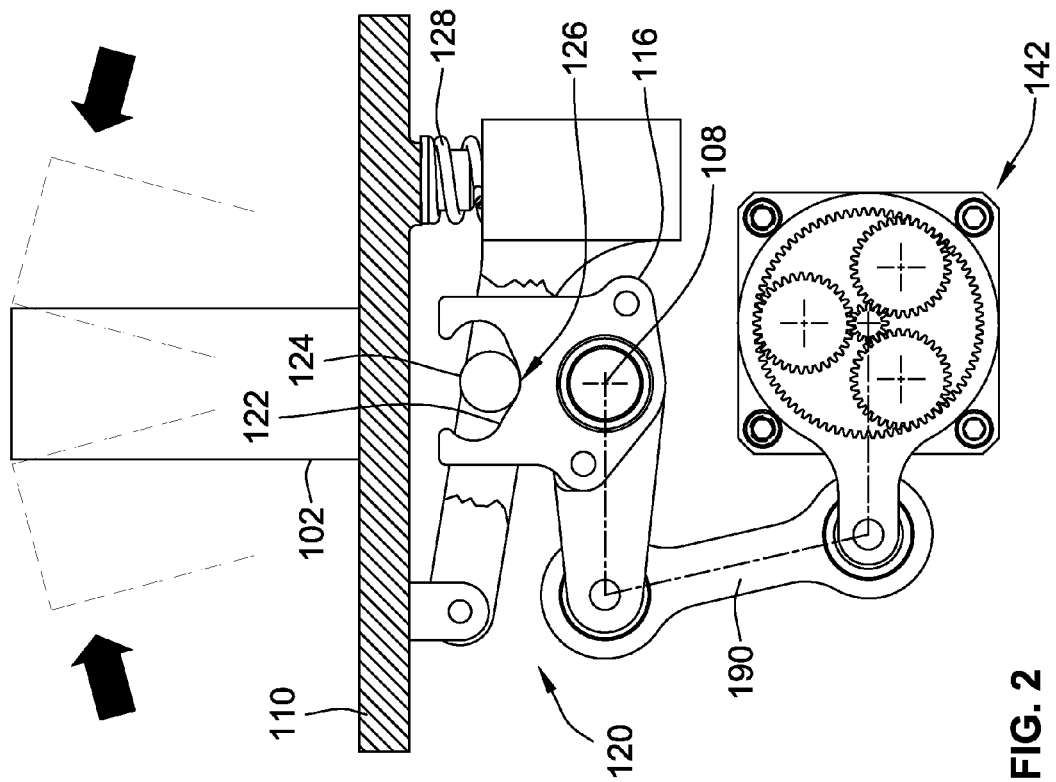
FIG. 2 is a partial illustration of the control stick of FIG. 1 illustrating the roll force feedback drive and the roll centering mechanism.

With reference to FIG. 2, the roll cam based centering mechanism 120 is illustrated. The roll cam based centering mechanism includes cam arrangement including a cam surface 122 and cam follower 124 that is biased against cam surface 122. In the illustrated embodiment, the cam surface 122 is operably coupled to the pilot input device 102 such that rotational motion about the roll axis 108 causes coordinated motion of the cam surface 122. The cam surface 122 defines a home position 126 which is a bottom most portion of the cam surface 122. When the pilot input device 102 is rotated from a center or home position (illustrated in solid lines), the cam follower 124 will move out of the home position 126 and move along cam surface 122. This motion will cause the cam surface 122 to apply a biasing force against the cam follower 124. The cam follower 124 is operably connected to a biasing element 128 in the form of a compression spring which will urge the cam follower 124 back towards the home position 124 and consequently bias the pilot input device 102 back towards its home position.

With reference to FIG. 1, a pitch cam based centering mechanism 130 is illustrated. The pitch cam based centering mechanism 130 operates in substantially the same manner as the roll cam based centering mechanism and is configured to bias the pilot input device back to a pitch home position illustrated in solid lines in FIG. 1 when the pilot input device 102 is rotated about the pitch axis 106. In this centering mechanism 130, the cam follower 132 is carried by the pilot input device 102 and the cam surface 134 is carried by or provided by a rocker arm 136 that cooperates with compression spring 138 when biased by cam follower 132 in response to movements of the pilot input device 102.

The control stick 100 includes a pitch force feedback drive 140 and a roll force feedback drive 142. The force feedback drives 140, 142 are configured to provide mechanical resistance to the pilot input device 102 when the pilot input device 102 is pivoted from the pitch and roll home positions about the corresponding pitch and roll axes 106, 108. The force feedback is typically configured to simulate the forces due to the control surfaces of the aircraft, because the control stick 100 is not mechanically linked to the control surfaces in the illustrated embodiment.

The pitch force feedback drive 140 includes a pitch motor 144 that operably drives a pitch gear train 146. The pitch motor 144 is preferably a resolver commutated brushless DC motor. The pitch motor 144 is operably mounted to the base frame 110. The pitch gear train 146 is preferably a compound-planetary gear head. In alternative embodiments, the pitch gear train 146 could take the form of a single stage or a multi-stage planetary gear head.

A pitch pinion gear 148 is operably coupled to the output shaft of the pitch motor 144 and acts as the sun gear of the compound-planetary gear head. Three pitch planetary gears 150 are radially positioned between the pitch sun gear, i.e. pitch pinion gear 148, and a rotating internal pitch ring gear 152. With additional reference to FIG. 3, the pitch gear train 146 includes a fixed position pitch planetary gear carrier 154 (also referred to as "pitch carrier 154") that carries the plurality of pitch planetary gears 150 for rotation about corresponding pitch planetary gear axes of rotation 156. The pitch carrier 154 includes axially extending shafts that define the pitch planetary gear axes of rotation 156. These shafts extend axially away from an outer cover portion 158 of the pitch carrier 154 towards the pitch motor 144. Because the pitch carrier 154 is a fixed position carrier, the pitch planetary gear axes of rotation 156 defined by the pitch carrier 154 do not move relative to base frame 110.

Figure 4:
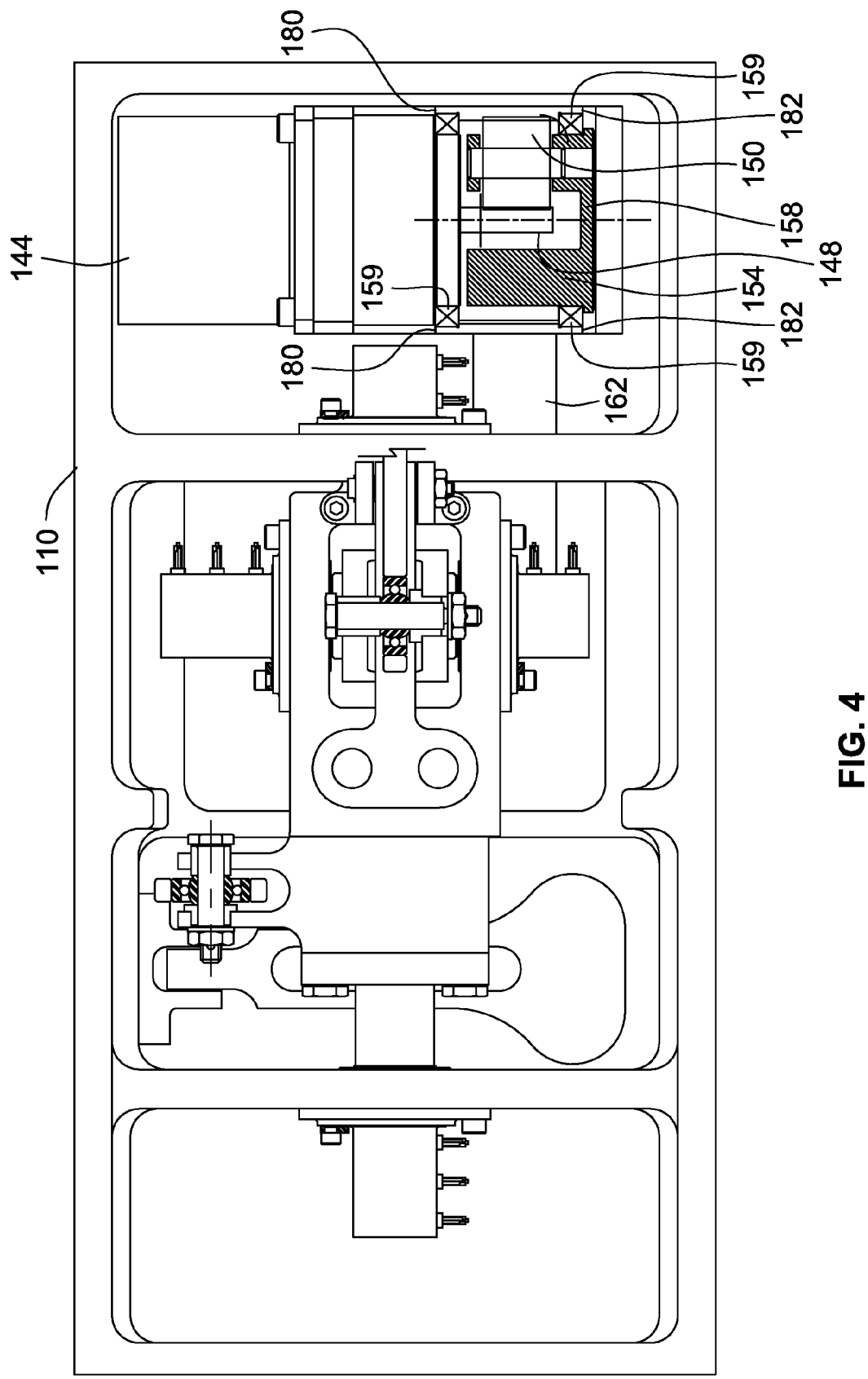
FIG. 4 is a partial top view illustration of the control stick of FIG. 1 having the pitch force feedback drive in partial cross-section.

With additional reference to FIG. 4, the pitch ring gear 152 is positioned axially between the pitch motor 144 and the outer cover portion 158. More particularly, the pitch ring gear 152 includes a first end 180 that is positioned axially (with reference to the rotational axis of the pitch pinion gear 148) proximate and facing the pitch motor 144 and a second, opposite, end 182 that faces axially way from the pitch motor 144 and is proximate the pitch carrier 154. The first end is positioned axially between the pitch motor 144 and the second end. The pitch ring gear 152 rotates relative to the fixed position base frame 110 about an axis of rotation that is co-axial with the rotational axis of the pitch pinion gear 144 due to the fact that the planetary gears 150 have a substantially fixed position relative to base frame 110 because of the inclusion of the fixed position pitch carrier 154. Further, the ring gear rotates about an axis of rotation that is parallel to the pitch axis 106.

The pitch ring gear 152 is supported by a pair of gearhead carrier bearings 159 (also referred to as "cage bearings 159") that support the pitch ring gear 152 for rotation about the rotational axis defined by the pitch pinion gear 148. The gear head carrier bearings 159 are axially offset from one another such that one of the gearhead carrier bearings 159 is proximate the pitch motor 144 and the other gearhead carrier bearing 159 is positioned proximate the cover portion 158 of the pitch carrier 154.

Figure 6:
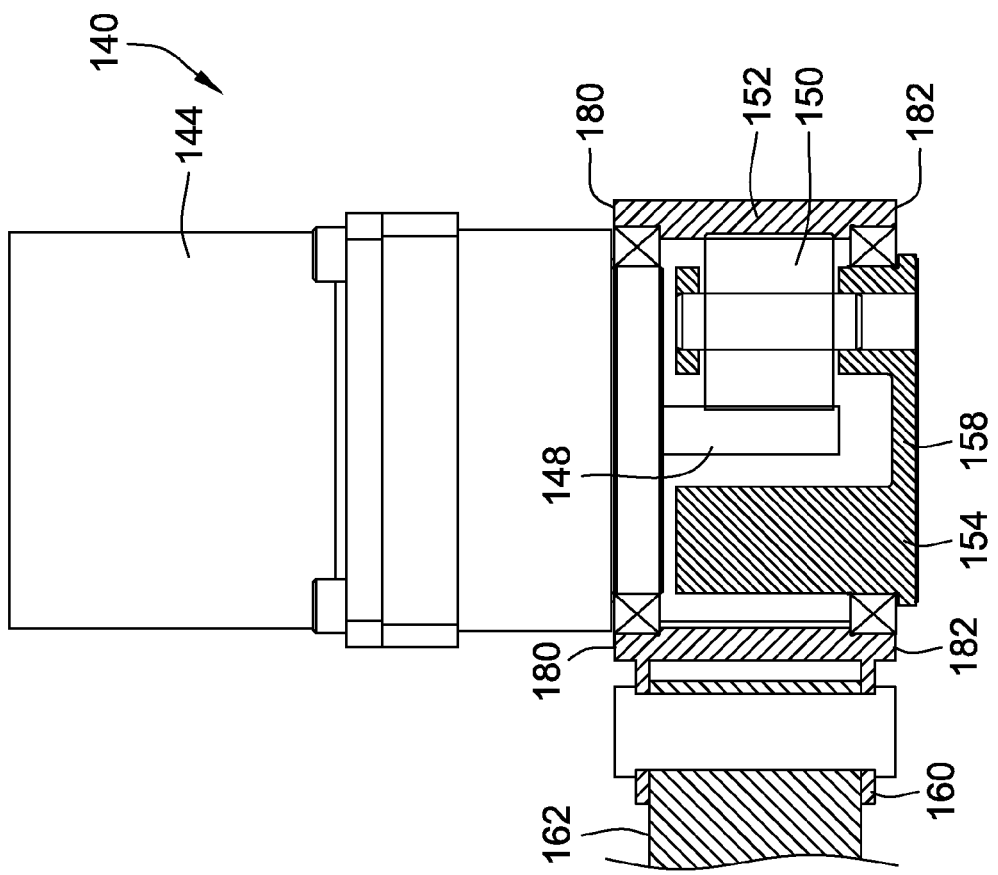
FIG. 6 is a simplified illustration of an embodiment of a force feedback drive useable in the control stick of FIG. 1.

With additional reference to FIG. 6, the pitch ring gear 152 includes a radially outward extending attachment feature 160. The attachment feature 160 is formed as a continuous piece with the rest of pitch ring gear 152 and is generally clevis- or U-shaped including two axially spaced apart radially outward extending legs. A pitch linkage 162 is operably coupled between the legs of the attachment feature 160 at a first end 164. The linkage 162 is operably coupled to the pilot input device 102 at a second opposite end 166.

The connection between the pilot input device 102 and the linkage 162 is offset from the pitch axis 106 such that rotational motion of the pitch ring gear 152 operably imparts a torque to the pilot input device 102 about the pitch axis 106 via the linkage 162. The linkage 162 may be directly connected to the pilot input device or the pitch gimbal device to be operably connected to the pilot input device 102. Preferably, the connections between the linkage 162 and the pilot input device 102 and the attachment feature 160 are rotationally free such that linkage 162 can rotate relative to the pilot input device 102 and the attachment feature 160 and the linkage 162 remains substantially in a state of tension or compression and not bending.

With additional reference to FIG. 6, the attachment feature 160 of the pitch ring gear 152 is positioned axially between the first and second ends of the pitch ring gear 152 and axially between the pitch motor 144 and the pitch carrier 154. Similarly, it is preferred that the linkage 162 is axially offset from the pitch carrier 154 and the second end of the pitch ring gear 152 towards the pitch motor 144. Preferably, the attachment feature 160 and the linkage 162 are positioned axially between the pair of gearhead carrier bearings 159 that rotationally support the pitch ring gear 152.

In one embodiment, the attachment feature 160 is not axially offset from the pitch ring gear 152. This arrangement provides a significant advantage by providing a shortened pitch force feedback drive 140 as compared to systems where the output is provided by a rotational planetary gear carrier. Due to the location of the control stick 100 within the cockpit of an aircraft, any reduction in footprint provided by the device is a significant benefit to the overall design. This also allows for the pitch force feedback drive 140 and particular the pitch motor 144 thereof to be more centrally located. Further, this arrangement of having the output of the pitch gear train 146 positioned between the gearhead carrier bearings 159, the moment load on the gearhead carrier bearings 159 is reduced from when the output is provided by a rotating planetary gear carrier.

While a prior embodiment of the attachment feature 160 is described as having two radially outward extending legs, alternative embodiments include only a single radially outward extending leg. In one embodiment, the leg may be positioned proximate the gear head carrier bearing 159 closest to the pitch motor 144. Alternatively, the leg may be centered between the pair of gear head carrier bearings 159. In a further embodiment, the leg could be positioned axially closest the gear head carrier bearing 159 that is axially furthest from the pitch motor 144.

When only a single radially extending leg is provided, the linkage may be attached on either side of the leg. The positioning of the linkage will depend on the particular location of the force feedback drive relative to the pilot input device 102. In one embodiment, the leg may be positioned axially adjacent the gear head carrier bearing 159 closest the pitch motor 144 with the linkage 162 coupled on a motor side of leg. In this arrangement, the linkage 162 is axially offset from the pitch ring gear 152 and is axially overlapping the pitch motor. More particularly, linkage 162 will be axially offset from end 180 of ring gear 152 in a direction extending away from end 182 and towards pitch motor 144. This allows the pitch linkage 162 to be substantially, if not completely, in line with the roll axis of rotation 108. This also allows for centering the pitch force feedback drive 140 substantially on the roll axis of rotation.

In an alternative embodiment, the pitch linkage 162 may be attached on the opposite side of the leg such that the linkage 162 is positioned axially between the pair of gear head carrier bearings 159 and it is axially offset over the ring gear 152 rather than over the pitch motor 144. This side of the leg may be considered a "free-end" side of the leg as it faces the free end of the force feedback drive and the planetary gear carrier. However, it is desired that the linkage 162 is not axially offset away from the motor 144 beyond the end 182 of the ring gear 152 and planetary gear carrier so as to avoid increasing the overall length of the pitch force feedback drive 140.

In operation, when the pitch axis sensors determine that the pilot has transitioned the pilot input device 102 from its pitch home position, controller 170 will cause the pitch force feedback drive 140 to apply a resistive force to the pilot input device 102 using the pitch motor 144 through pitch gear train 146 and linkage 162.

Figure 5:
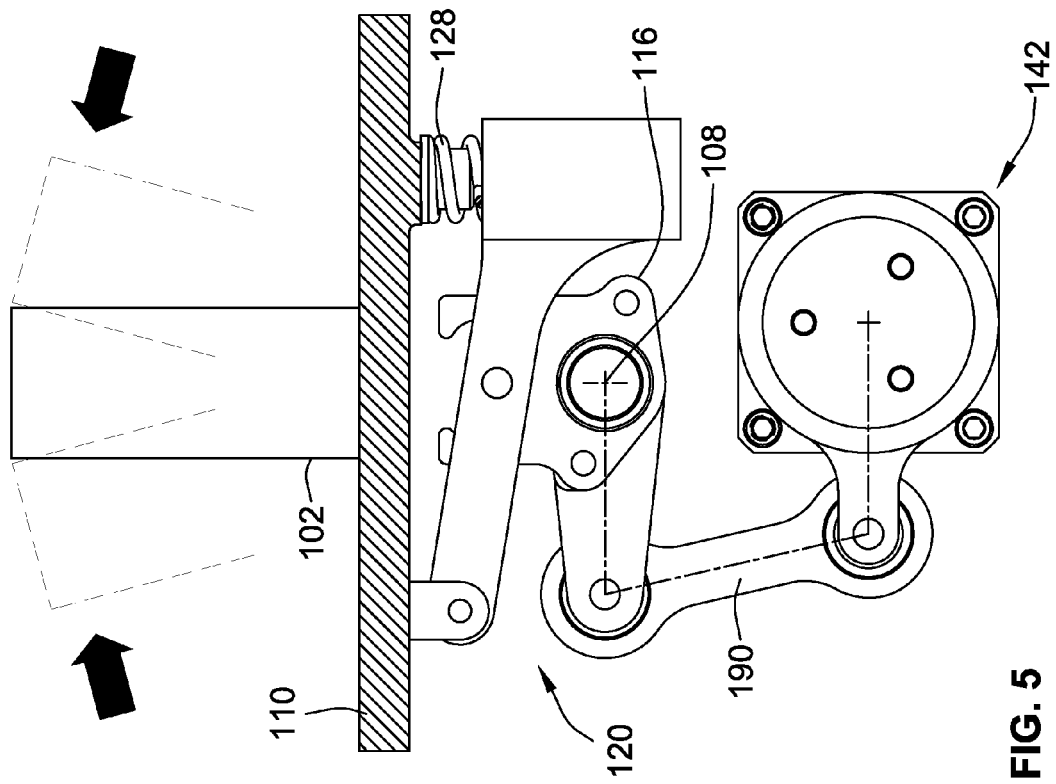
FIG. 5 is an illustration similar to FIG. 2 further including the fixed position roll planetary gear carrier.
Figure 3:
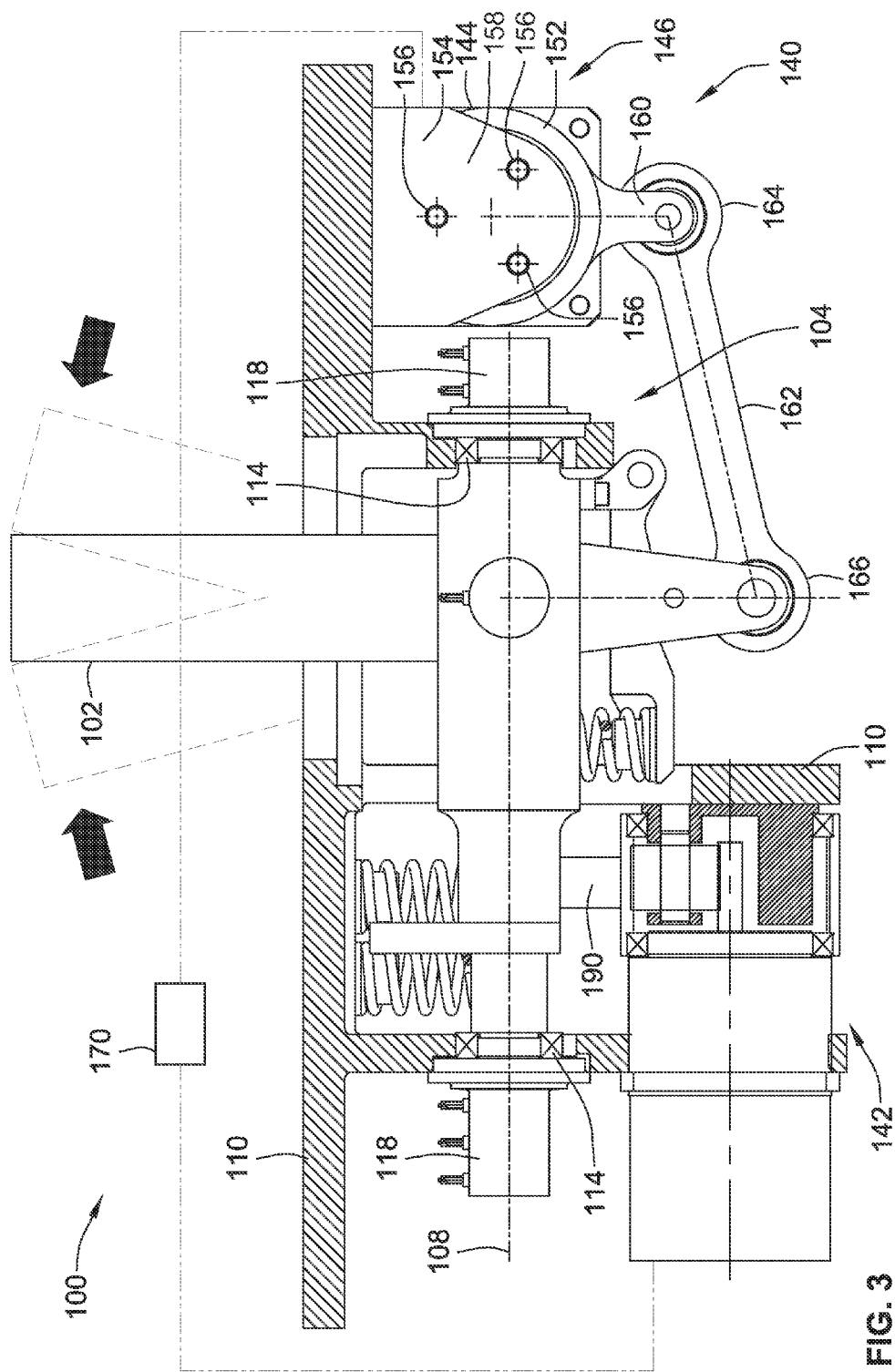
FIG. 3 is another illustration of the control stick of FIG. 1 including the fixed position pitch planetary gear carrier.

The roll force feedback drive 142, see e.g. FIGS. 2-3 and 5, is substantially identical to the pitch force feedback drive 140 discussed above. However, the roll force feedback drive 142 provides resistive feedback to the pilot input device 102 when the pilot input device 102 is pivoted about roll axis 108 from the roll home position. The roll force feedback drive 142 may also be connected to controller 170 or its own separate controller.

In the illustrated embodiment, the roll linkage 190 is shorter than the pitch linkage 162. The only other significant difference between the roll force feedback drive 142 is that the rotational axes of the gears in the gear train for the roll force feedback drive 142 rotate about which the ring gear thereof rotate are perpendicular to the pitch axis 108 and the rotational axes for the gears of the pitch force feedback drive 140. This is due to the fact that the pitch and roll axes 106, 108 are generally parallel to one another.

As noted above, the pitch and roll force feedback drives 140, 142 may be identical, due to the compact geometry of the present embodiment.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A compact two-axis control stick comprising:
   a pilot input device pivotable about a pitch axis and a roll axis;
   a pitch force feedback drive including:
      a pitch motor including an output shaft;
      a pitch gear train including a pitch sun gear mounted to the output shaft of the pitch motor, a plurality of pitch planet gears mounted to a permanently fixed position pitch carrier, and a pitch ring gear, the plurality of pitch planet gears radially positioned between the pitch sun gear and the pitch ring gear;
   a roll force feedback drive including:
      a roll motor including an output shaft;
      a roll gear train including a roll sun gear mounted to the output shaft of the roll motor, a plurality of roll planet gears mounted to a fixed position roll carrier, and a roll ring gear, the plurality of roll planet gears radially positioned between the roll sun gear and the roll ring gear; and
   a pitch linkage operably coupling the pitch force feedback drive to the pilot input device, the pitch linkage being operably coupled to the pilot input device and the pitch ring gear such that rotation of the pitch ring gear causes rotation of the pilot input device about the pitch axis;
   a roll linkage operably coupling the roll force feedback drive to the pilot input device, the roll linkage being operably coupled to the pilot input device and the roll ring gear such that rotation of the roll ring gear causes rotation of the pilot input device about the roll axis.

2. The control stick of claim 1, wherein the roll force feedback drive and the pitch force feedback drive are substantially identical.

3. The control stick of claim 1, wherein the pitch motor output shaft rotates about a rotational axis that is parallel to the pitch axis and the roll motor output shaft rotates about a rotational axis that is parallel to the roll axis, the rotational axes of the pitch motor output shaft and the roll motor output shaft being general perpendicular to one another.

4. The control stick of claim 1, further comprising:
   a pitch centering mechanism acting on the pilot input device to bias the pilot input device to a pitch home position when the pilot input device is rotated about the pitch axis away from the pitch home position; and
   a roll centering mechanism acting on the pilot input device to bias the pilot input device to a roll home position when the pilot input device is rotated about the roll axis away from the roll home position.

5. The control stick of claim 1, further comprising a base frame to which the pilot input device is operably pivotably mounted for rotation about the pitch and roll axes, the fixed position pitch carrier defining a rotational axis for each of the plurality of pitch planet gears, the fixed position pitch carrier having a fixed position relative to the base frame and maintaining the rotational axes of the plurality of pitch planet gears in a fixed position relative to the base frame; and
   the fixed position roll carrier defining a rotational axis for each of the plurality of roll planet gears, the fixed position roll carrier having a fixed position relative to the base frame and maintaining the rotational axes of the plurality of roll planet gears in a fixed position relative to the base frame.

6. The control stick of claim 1, wherein the pitch ring gear includes a radially outward extending attachment feature, the pitch linkage pivotally operably connected to the radially outward extending attachment feature of the pitch ring gear proximate a first end of the pitch linkage and the pitch linkage is pivotally operably connected to the pilot input device proximate a second end of the pitch linkage; and
   wherein the roll ring gear includes a radially outward extending attachment feature, the roll linkage pivotally operably connected to the radially outward extending attachment feature of the roll ring gear proximate a first end of the roll linkage and the roll linkage is pivotally operably connected to the pilot input device proximate a second end of the roll linkage.

7. The control stick of claim 6, wherein the pitch ring gear has a first end adjacent the pitch motor and a second end, opposite the first end, the second end is spaced away from the pitch motor with the first end positioned axially between the second end and the pitch motor along an axis defined by the pitch motor output shaft, the radially outward extending attachment feature of the pitch ring gear does not extend axially outward beyond the second end; and
   wherein the roll ring gear has a first end adjacent the roll motor and a second end, opposite the first end, the second end is spaced away from the roll motor with the first end positioned axially between the second end and the roll motor along an axis defined by the roll motor output shaft, the radially outward extending attachment feature of the roll ring gear does not extend axially outward beyond the second end.

8. The control stick of claim 6, further comprising a pair of axially spaced apart gearhead carrier bearings radially supporting the pitch ring gear for rotation, the radially outward extending attachment feature of the pitch ring gear is positioned axially adjacent one of the gearhead carrier bearings; and
   a pair of axially spaced apart gearhead carrier bearings radially supporting the roll ring gear for rotation, the radially outward extending attachment feature of the roll ring gear positioned axially adjacent one of the gearhead carrier bearings.

9. The control stick of claim 8, wherein the radially outward extending attachment feature of the pitch ring gear has a single leg that extends radially outward and the pitch linkage is operably connected on a side of the leg; and wherein the radially outward extending attachment feature of the roll ring gear has a single leg that extends radially outward and the roll linkage is operably connected on a side of the leg.

10. The control stick of claim 9, wherein the pitch linkage is connected on a pitch motor side of the leg of the pitch ring gear such that it is substantially in line with the roll axis of rotation; and wherein the roll linkage is connected on a side of the leg opposite the roll motor with the roll linkage positioned axially between the pair of gear head carrier bearings.

11. A method of providing force feedback to a pilot input device comprising:

sensing a displacement of the pilot input device about a pitch axis;

providing pitch force feedback to bias the pilot input device back toward a pitch home position using a pitch force feedback drive operably connected to the pilot input device with a pitch linkage, the pitch force feedback drive including:
a pitch motor including an output shaft; and
a pitch gear train including a pitch sun gear mounted to the output shaft of the pitch motor, a plurality of pitch planet gears mounted to a permanently fixed position pitch carrier, and a pitch ring gear, the plurality of pitch planet gears radially positioned between the pitch sun gear and the pitch ring gear, the pitch linkage operably coupled to the pitch ring gear;

sensing a displacement of the pilot input device about a roll axis; and providing roll force feedback to bias the pilot input device back toward a roll home position using a roll force feedback drive operably connected to the pilot input device with a roll linkage, the roll force feedback drive including:
a roll motor including an output shaft; and
a roll gear train including a roll sun gear mounted to the output shaft of the roll motor, a plurality of roll planet gears mounted to a fixed position roll carrier, and a roll ring gear, the plurality of roll planet gears radially positioned between the roll sun gear and the roll ring gear, the roll linkage operably coupled to the roll ring gear.

12. The method of claim 11, wherein the pitch ring gear includes a radially outward extending attachment feature, the pitch linkage pivotally connected to the radially outward extending attachment feature of the pitch ring gear proximate a first end of the pitch linkage and the pitch linkage is pivotally connected to the pilot input device proximate a second end of the pitch linkage; and wherein the roll ring gear includes a radially outward extending attachment feature, the roll linkage pivotally connected to the radially outward extending attachment feature of the roll ring gear proximate a first end of the roll linkage and the roll linkage is pivotally connected to the pilot input device proximate a second end of the roll linkage.

13. The method of claim 12, wherein the pitch ring gear has a first end adjacent the pitch motor and a second end, opposite the first end, the second end is spaced away from the pitch motor with the first end positioned axially between the second end and the pitch motor along an axis defined by the pitch motor output shaft, the radially outward extending attachment feature of the pitch ring gear being positioned inward from the second end of the pitch ring gear towards the pitch motor; and wherein the roll ring gear has a first end adjacent the roll motor and a second end, opposite the first end, the second end is spaced away from the roll motor with the first end positioned axially between the second end and the roll motor along an axis defined by the roll motor output shaft, the radially outward extending attachment feature of the roll ring gear being positioned inward from the second end of the roll ring gear towards the roll motor.

14. The method of claim 13, further comprising a pair of axially spaced apart gearhead carrier bearings radially supporting the pitch ring gear for rotation, the radially outward extending attachment feature of the pitch ring gear is positioned axially adjacent the gearhead carrier bearing axially closest the pitch motor; and a pair of axially spaced apart gearhead carrier bearings radially supporting the roll ring gear for rotation, the radially outward extending attachment feature of the roll ring gear is positioned axially adjacent the gearhead carrier bearing axially closest the pitch motor.

15. An apparatus for providing force feedback to a pilot input device comprising:

a force feedback drive including:
a motor including an output shaft; and
a gear train including a sun gear mounted to the output shaft of the motor, a plurality of planet gears mounted to a fixed position carrier, the fixed position carrier being fixed during all phases of operation, and a ring gear, the plurality of planet gears radially positioned between the sun gear and the ring gear; and a linkage configured to operably couple the force feedback drive to the pilot input device, the linkage is configured to be operably coupled to the pilot input device, the linkage being operably coupled to the ring gear such that rotation of the pitch ring gear causes motion of the linkage.

16. The apparatus of claim 15, wherein the fixed position carrier defines a rotational axis for each of the plurality of planet gears, the fixed position carrier having a fixed position relative to motor and maintaining the rotational axes of the plurality of planet gears in a fixed position relative to the motor.

17. The apparatus of claim 15, wherein the ring gear includes a radially outward extending attachment feature, the linkage pivotally connected to the radially outward extending attachment feature of the ring gear proximate a first end of the linkage.

18. The apparatus of claim 17, wherein the ring gear has a first end adjacent the motor and a second end, opposite the first end, the second end is spaced away from the motor with the first end positioned axially between the second end and the motor along an axis defined by the motor output shaft, the radially outward extending attachment feature not extending axially beyond the second end of the ring gear in a direction extending away from the motor.

19. The apparatus of claim 17, further comprising a pair of axially spaced apart gearhead carrier bearings rotatably supporting the ring gear for rotation, the radially outward extending attachment feature being substantially axially centered relative to the gearhead carrier bearings.

20. The control stick of claim 19, wherein the radially outward extending attachment feature of the ring gear has a single leg that extends radially outward and the linkage is connected to a side of the leg but does not extend axially beyond an end of the ring gear opposite the motor.

* * * * *